(12) United States Patent
Sekhar et al.

(10) Patent No.: US 9,359,237 B2
(45) Date of Patent: Jun. 7, 2016

(54) DIGESTER FOR DEGRADATION OF HUMAN WASTE

(75) Inventors: Krishnamurthy Sekhar, Gwalior, IN (US); Dev Vrat Kamboj, Gwalior, IN (US); Lokendra Singh, Gwalior, IN (US); Vichitra Kumar Gangwar, Gwalior, IN (US); Arvind Tomar, Gwalior, IN (US); Ramesh Chand Meena, Gwalior, IN (US)

(73) Assignee: THE DIRECTOR GENERAL, DEFENSE RESEARCH AND DEVELOPMENT ORGANIZATION, New Delhi (IN)

( * ) Notice: Subject to any disclaimer, the term of this patent is extended or adjusted under 35 U.S.C. 154(b) by 2155 days.

(21) Appl. No.: 12/307,872

(22) PCT Filed: Jul. 9, 2007

(86) PCT No.: PCT/IN2007/000278
§ 371 (c)(1),
(2), (4) Date: Dec. 7, 2009

(87) PCT Pub. No.: WO2008/004252
PCT Pub. Date: Jan. 10, 2008

(65) Prior Publication Data
US 2010/0089808 A1    Apr. 15, 2010

(30) Foreign Application Priority Data

Jul. 7, 2006    (IN) .......................... 1595/DEL/2006

(51) Int. Cl.
*B01D 21/00*    (2006.01)
*C02F 1/20*    (2006.01)
*C02F 1/76*    (2006.01)
(Continued)

(52) U.S. Cl.
CPC ............ *C02F 3/1242* (2013.01); *B01D 21/003* (2013.01); *C02F 1/20* (2013.01); *C02F 1/76* (2013.01); *C02F 9/005* (2013.01); *C02F 11/14* (2013.01); *C02F 2103/005* (2013.01); *Y02W 10/15* (2015.05)

(58) Field of Classification Search
USPC ........... 210/95, 121, 205, 206, 232, 237, 238, 210/294, 298, 320, 631, 754, 127, 180, 188, 210/241; 422/105, 106, 129, 630
See application file for complete search history.

(56) References Cited

U.S. PATENT DOCUMENTS 699,345 A * 5/1902 Provost .......................... 210/305
RE20,451 E * 7/1937 Ornstein ....................... 210/607
(Continued)

OTHER PUBLICATIONS

International Preliminary Search Report on Patentability for PCT/in2007/00278 issued by the United States International Searching Authority (8 pages).

*Primary Examiner* — Joseph Drodge
(74) *Attorney, Agent, or Firm* — Faegre Baker Daniels LLP

(57) ABSTRACT

A digester for degradation of human waste comprising a main tank having biochemical treatment compartment and chemical treatment compartment connected by connecting pipe as a passage for bio-chemically treated waste to chemical treatment compartment; the biochemical treatment compartment has at least one loosely fitted partitioned wall and at least one inlet to receive waste, at least one gas outlet and at least one waste drain pipe to remove sludge; the chemical treatment compartment has discharge means to discharge treated waste and excess of liquid, and float ball assembly to release chemical for chemical treatment.

21 Claims, 3 Drawing Sheets

(51) Int. Cl.
*C02F 3/00* (2006.01)
*C02F 9/00* (2006.01)
*C02F 11/00* (2006.01)
*C02F 3/12* (2006.01)
*C02F 11/14* (2006.01)
*C02F 103/00* (2006.01)

(56) References Cited

U.S. PATENT DOCUMENTS

| | | | | |
|---|---|---|---|---|
| 3,089,757 A | * | 5/1963 | Buswell et al. | 422/106 |
| 3,476,250 A | * | 11/1969 | Fifer | 210/199 |
| 3,624,665 A | * | 11/1971 | Klingle, Sr. | A47K 11/035 |
| | | | | 210/259 |
| 3,655,050 A | * | 4/1972 | Fifer | 210/86 |
| 3,666,103 A | * | 5/1972 | Green | 210/197 |
| 3,780,997 A | * | 12/1973 | Hargraves | 261/77 |
| 3,873,445 A | * | 3/1975 | Bussard | C02F 1/76 |
| | | | | 210/149 |
| 3,981,803 A | * | 9/1976 | Coulthard | 210/178 |
| 4,599,168 A | * | 7/1986 | Benjes et al. | 210/151 |
| 4,865,631 A | * | 9/1989 | Stroby et al. | 4/321 |
| 5,384,033 A | * | 1/1995 | Matasovic | 210/121 |
| 5,698,095 A | * | 12/1997 | Kami | 210/173 |
| 5,928,514 A | * | 7/1999 | Gothreaux | 210/617 |
| 6,627,071 B1 | * | 9/2003 | Braden | 210/121 |
| 6,770,247 B1 | * | 8/2004 | Romack et al. | 422/123 |
| 7,892,422 B2 | * | 2/2011 | Chaffin | 210/121 |
| 2002/0046712 A1 | | 4/2002 | Tripp et al. | |
| 2003/0080055 A1 | * | 5/2003 | Gross | 210/620 |
| 2003/0188695 A1 | | 10/2003 | Robohm | |
| 2004/0020401 A1 | * | 2/2004 | Kaye | 105/26.1 |
| 2004/0045899 A1 | * | 3/2004 | Humphrey | C02F 3/02 |
| | | | | 210/620 |
| 2005/0218074 A1 | | 10/2005 | Pollock | |
| 2006/0012219 A1 | * | 1/2006 | Ingram et al. | 296/168 |
| 2006/0151497 A1 | * | 7/2006 | Underwood | 220/200 |

* cited by examiner

DIGESTER FOR DEGRADATION OF HUMAN WASTE

FIELD OF INVENTION

This invention relates to a digester for human waste handling, treatment and disposal in mobile public carriers. In particular the invention provides an apparatus for efficient biodegradation of human waste and chemical treatment for safe environmental disposal.

BACKGROUND OF THE INVENTION

There are various types of organic pollutants that mostly comprise of human waste (night soil), animal waste, food and chemical industry wastes. These, if discharged to aquatic bodies are subjected to decomposition by natural microbial population which consumes the dissolved oxygen of the surroundings resulting in disturbance of aquatic flora and fauna. Among these wastes human waste is of high concern because of its aesthetic and environmental nuisance. Its deterioration starts even before it is discharged from the human body. Besides leading to organic pollution, it is a store house of pathogens and is responsible for various water borne diseases such as cholera, jaundice and typhoid.

Historically, humans used to defecate in open areas where it was left for drying/natural degradation. Subsequently, the human waste was physically transported to an isolated area earmarked for its natural degradation which was not only generating off odorous compounds but also polluting and contaminating the natural surroundings. With the development of civilization, researchers are continually searching for newer methods for safe disposal of human waste. At present there are various options being practiced in various parts of the world, which include physical transportation, chemical and biological treatment (U.S. Pat. No. 5,580,457). Transporting of wastes from high population density is a costly affair because of the high cost of land in the adjoining areas and operational cost associated if waste is removed to remote locations of low cost. This is particularly problematic if liquid waste is to be transported to the disposal site. Incineration of the waste is facing increasing public resistance due to the release of noxious gases and high costs. In general chemicals used to treat the waste do not completely degrade the human waste and as a result add to the environmental pollution.

Biodegradation is considered to be the most preferable way of treating the waste because of its self-sustainability, cost effectiveness and eco-friendliness. It is carried out in two different ways: aerobically and an aerobically. Aerobic process employs bacteria, which have ability to use oxygen in energy generation. Because of this ability the addition of oxygen or air to a bioreactor/digester can increase the aerobic population rapidly. This increase in population results in increased rate of biodegradation but unfortunately aerobic population becomes the sludge/pollutant. This sludge must be removed prior to discharge of treated material into the environment. Moreover, aerobic process is an energy intensive process requiring energy for aeration. On the other hand, anaerobic process employs bacteria, which grow strictly in the absence of air/oxygen. These bacteria are inhibited by oxygen rich environment. Anaerobic process does not essentially require the energy for its operation and the amount of sludge generated are comparatively very less because of lower biomass produced in absence of oxygen. The main products of anaerobic degradation include methane, carbon dioxide and hydrogen sulphide. Methane is primary component of natural gas and is readily combustible and thus can be burnt to produce energy without posing any significant environmental hazards. Moreover, anaerobic processes are known to inactivate the pathogens present in the human waste.

There are two kinds of human waste treatment systems. In the first kind all residences, businesses and the institutions in a municipality are connected through a network of sanitary sewers to a central sewage treatment plant. The second kind is the septic tank system mostly installed for single family where usually connection to a sewer is not available. However, there is no system/apparatus available, which can be used for human waste treatment in public carriers like train, bus, boat, aeroplane etc. for on-site treatment. The only option in these public transports is to collect the waste in a closed container and to transport it to the site of the treatment. To avoid the foul smell at the site of collection, chemicals are added to the collection which ultimately delay/retard the biodegradation process but create the problem at the site of biological treatment. In other words, this approach requires manpower, infrastructure and money for disposal of human waste generated in the public transport vehicles. Indian railway is the biggest public carrier in the world. Presently, there is no provision for storage collection and transportation of human waste generated during journey in the toilets is discharged on the rail tracks, thus creating aesthetic nuisance, foul smell, breeding place for insects and also the risks of various diseases because of the presence of pathogens. The situation is even more precarious at railway stations.

Therefore, there is a need of an apparatus (hereafter called as digester) which can be fitted onto a public transport vehicle and degrade the human waste for its safe disposal.

OBJECTS OF THE INVENTION

The primary object of the present invention is to provide a digester capable of biochemical degradation of the human waste.

Another object of the present invention is to provide a digester capable of anaerobic degradation of the human waste.

Yet another object of the invention is to perform the chlorination of the biologically treated waste to make it free from foul smelling compounds and pathogenic microorganisms.

Further, object of the present invention is to provide digester, which can be fitted onto a public transport vehicle without affecting the sitting capacity of the vehicle.

Still another object of the digester which is easy to use, maintain and cost effective.

Further object of the present invention is to provide digester, which is long lasting and resistant to the jerks and various environmental conditions.

Another object is that in the process is to design the self sustainable digester, i.e., the digester does not require any external energy for its operation.

Another object is that in the process of human waste treatment, repeated addition of bacteria is not required and one time addition of the inoculum is sufficient.

Yet another objective is to provide a digester, which can convert the human waste into odorless and inflammable biogas.

Another object of the present invention is to provide a matrix for immobilization of bacteria for maintaining them at high concentration for fast biodegradation.

Yet another object is to provide the biodegrading surface for bacterial attachment so that the digester can withstand washout of bacteria during excessive use of water by passengers.

SUMMARY OF THE INVENTION

In order to achieve the above mentioned objectives the present invention provides a digester for degradation of human waste comprising a main tank (1) having biochemical treatment compartment (2) and chemical treatment compartment (3) connected by connecting pipe (4) as a passage for biochemically treated waste to chemical treatment compartment; the biochemical treatment compartment having at least one loosely fitted partitioned wall (5) and at least one inlet (6/7) for receiving the wastes, at least one gas outlet pipe (9/10) and at least one waste drain pipe (11/12) to remove sludge; the chemical treatment compartment has discharge means (8) to discharge treated waste and excess of liquid, and float ball assembly (14) to release chemical for chemical treatment.

The loosely fitted partitioned walls (5) are open from above or below or combination thereof in the biochemical compartment.

The loosely fitted partitioned wall (5) are attached with PVC sheet on its at least one side. The inner side of (13) and the bottom of the biochemical compartment have also been attached with PVC sheets.

The connecting pipe (4) is inverted "L" shaped galvanized iron pipe.

The chemical treatment compartment (3) have float ball assembly (14) fitted onto lever to supply chemical for chemical treatment in the chemical treatment compartment. Further, the chemical used for chemical treatment is chlorine balls.

The discharge means (8) is a siphon.

The main tank (1) has groove (15) in the central top portion for supply lines connecting different railway compartments.

Further the main tank has at least four hooks and at least two inbuilt support. Moreover, at least two handles are provided at the top lid of the digester for maintenance.

DESCRIPTION OF THE DRAWINGS

The present invention will now be illustrated with the help of accompanying drawing, which illustrates an embodiment of the present invention. It is to be noted that the principles and features of the invention may be incorporated in different embodiments without departing from the scope of the present invention.

DESCRIPTION OF THE INVENTION

The present invention will now be illustrated with the help of accompanying drawing, which illustrates embodiments of the present invention. It is to be noted that the principles and features of the invention may be incorporated in different embodiments without departing from the scope of the present invention.

In the first embodiment of the invention is provided a digester for continuous degradation of human waste by anaerobic bacteria. The digester has two chambers; one for biological degradation of human waste and second for chemical treatment. The digester is made up of stainless steel, rectangular in shape and is sufficient to treat the human waste of 35-40 persons. The tank is to be fitted on the bottom of the coach. It covers almost full width of the coach and has one central notch as passage for supply lines connecting different railway compartments. The waste, from toilets enters to one side of the digester through two inlet pipes where biological treatment is carried out. Polyvinyl chloride sheets attached on sides of the partition walls, bottom wall and on both sides of intermediary partitions serve as immobilization matrix for anaerobic microbial consortium to resist the washout of cultures and for better tolerance of microorganisms for adverse conditions like extremes of pH, VFA, and temperature. The fermented human waste enters the chlorination chamber via galvanized iron pipe. Chlorine balls are added to the waste through a float ball assembly connected through a pipe to a box containing chlorine balls. The effluent from chlorination tank is discharged out of the digester through a siphon arrangement. Biogas from the fermentation chamber is released continuously through gas pipes. Two drain outlets are provided on the bottom of the tank for maintenance of the digester.

Figure 1:
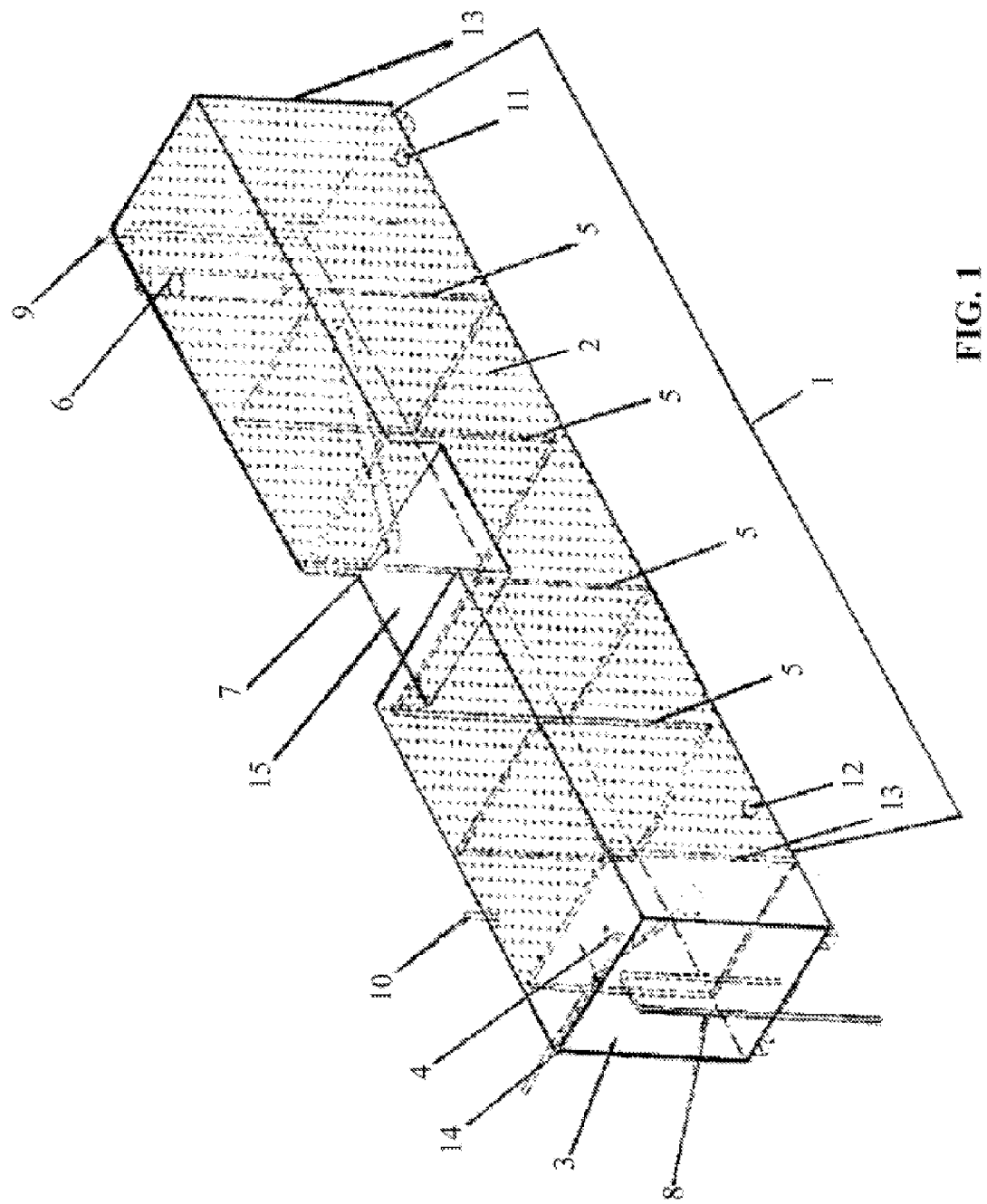
FIG. 1: shows the isometric view of the digester.

Referring to FIG. 1, the digester consists of one rectangular SS tank (1) having thickness of 3 mm with working volume of 650-750 L. The tank is divided into two chambers; one for biological treatment (2) and another for chemical treatment (3). The tank has dimensions of 2350-2500 mmL×650-750 mmW×575-625 mmD and has a groove of 475-525 mmL× 650-750 mmW×175-225 mmD in the central top portion (15). The two submerged inlet pipes (6,7) of diameter 70-100 mm are meant for connecting the two opposing toilets of the coach to the tank. The fermentation chamber has four partition walls of 475-500 mm height across width of SS tank having a thickness of 2 mm (5). PVC sheets having a surface area 59 $m^2/g$ and thickness of 7-10 mm are provided on both sides of the partition walls (5) as well as on inner side walls (13) besides at the bottom of the biochemical treatment compartment. The chlorination tank (3) is made opposite to inlet side of the main tank by providing a SS wall. The dimensions of the chlorination tank are 190-210 mm×650-750 mm×575-625 mm. The partition between fermentation and chlorine tank contains an inverted 'L' shape galvanized iron pipe (4) of 35-40 mm diameter as passage for fermented waste to pass into the chlorination tank. Chlorination tank is fitted with a chlorine ball dispensing assembly (14) to dispense the chlorine balls one by one into the biologically treated waste. Chlorination assembly is meant for automatic addition of chlorine balls into the biologically treated waste. It is based on hydraulic movement of float ball fitted on to the lever connected to a wheel containing a notch for resting of one chlorine ball at a time. Chlorine balls are filled in a box outside the digester which is connected with the assembly through a tube. As the biologically treated waste water accumulates in the chlorination tank, the float ball of the chlorine assembly starts lifting up as a result the wheel of the assembly also starts rotating. After reaching a pre-set height the notch in the wheel gets away from the tube fills with chlorine balls, and thus the balls falls down. As the float ball lifts up further due to accumulation of the treated water, a stage comes when the outlet pipe (8) made of 12-17 mm diameter is filled completely with the treated water. This outlet pipe is designed to work like a siphon. At this stage siphon gets activated and results in complete discharge of the treated water from the chlorination chamber. After complete discharge of the treated water, the wheel and the float ball of the chlorination assembly come to their original position and get ready for another cycle of chlorine ball addition and discharge of the treated waste through activation of siphon. The digester has two gas outlet pipes (9, 10) of 10-12 mm diameter, and waste drain pipes (11,12) of 35-40 mm diameter for maintenance purpose on either side.

In the second embodiment (FIGS. 2 and 3) of the invention is provided a digester for continuous degradation of human waste by anaerobic bacteria. The digester is made of stainless steel (SS), rectangular in shape and is sufficient to treat the human waste of 15-20 persons. The tank is to be fitted on the bottom of the coach. The digester has two chambers; one for biological degradation of human waste (1), and second for chemical treatment (2). The waste from the toilet enters to one side of the digester through an inlet pipe (3) where biological treatment is carried out. Polyvinyl chloride (PVC) sheets attached on side walls, bottom wall and on both sides of intermediary partitions serve as immobilization matrix (4, 5) for anaerobic microbial consortium to resist the washout of cultures and for better tolerance of microorganisms for adverse conditions like extremes of pH, VFA, and temperature. The fermented human waste enters the chlorination chamber (2) via galvanized iron (GI) pipe (6). Chlorine is added to the biologically treated waste through an inlet pipe (7) in the chlorination chamber (2). The effluent from chlorination tank is discharged out of the digester through an outlet pipe (8). Biogas from fermentation chamber is released continuously through a gas pipe (9). A window (10) is provided on the side of the fermentation chamber for maintenance, if required. Four hooks are provided with two inbuilt stainless steel support (11). Two handles (12) are provided on the top lid of the digester for maintenance.

The immobilization matrix in the form of PVC on partitions, bottom and sides for attachment of bacteria to prevent washout, having higher cell mass for enhanced fermentation, better tolerance of bacteria for adverse environmental conditions and to have better baffling. The submerged inlet pipes prevent the entry of foul smelling gases from the head space to the toilet. The maintenance Window on the side of fermentation chamber helps in removal of sludge and maintenance.

Figure 2:
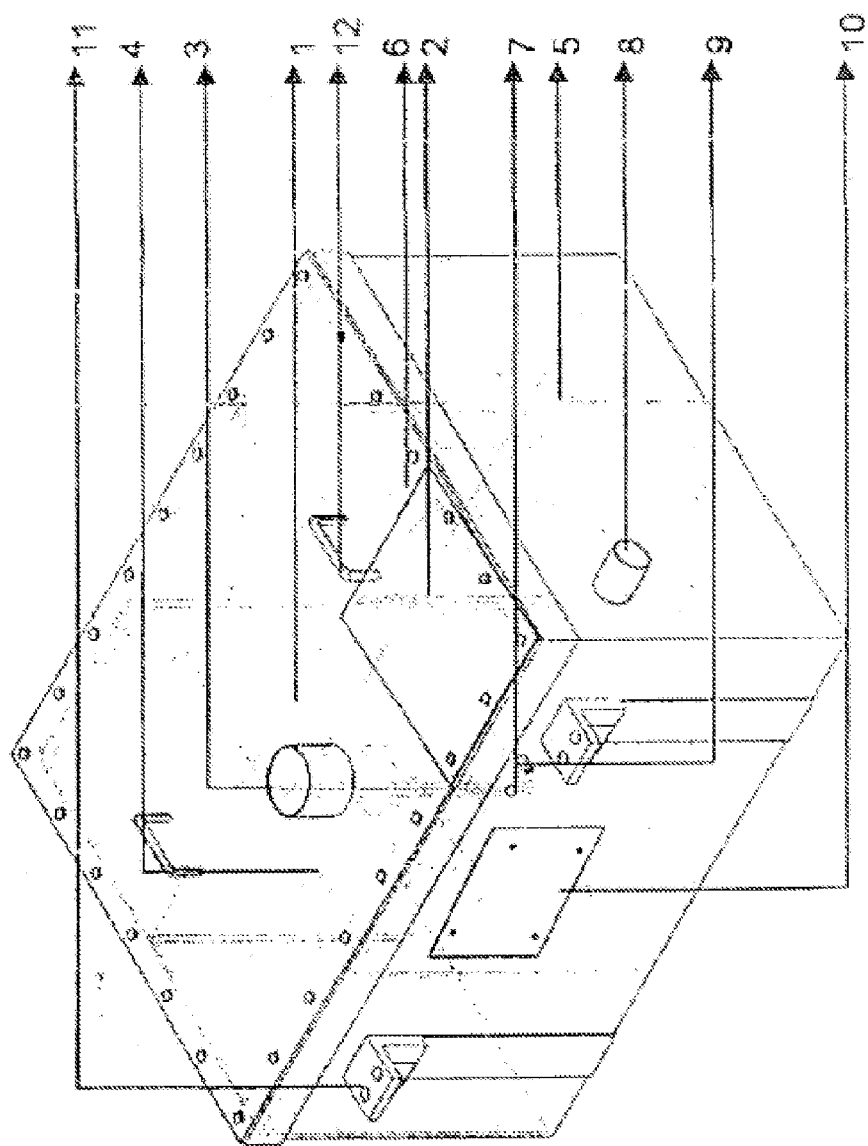
FIG. 2: shows the isometric inner view of the digester.
Figure 3:
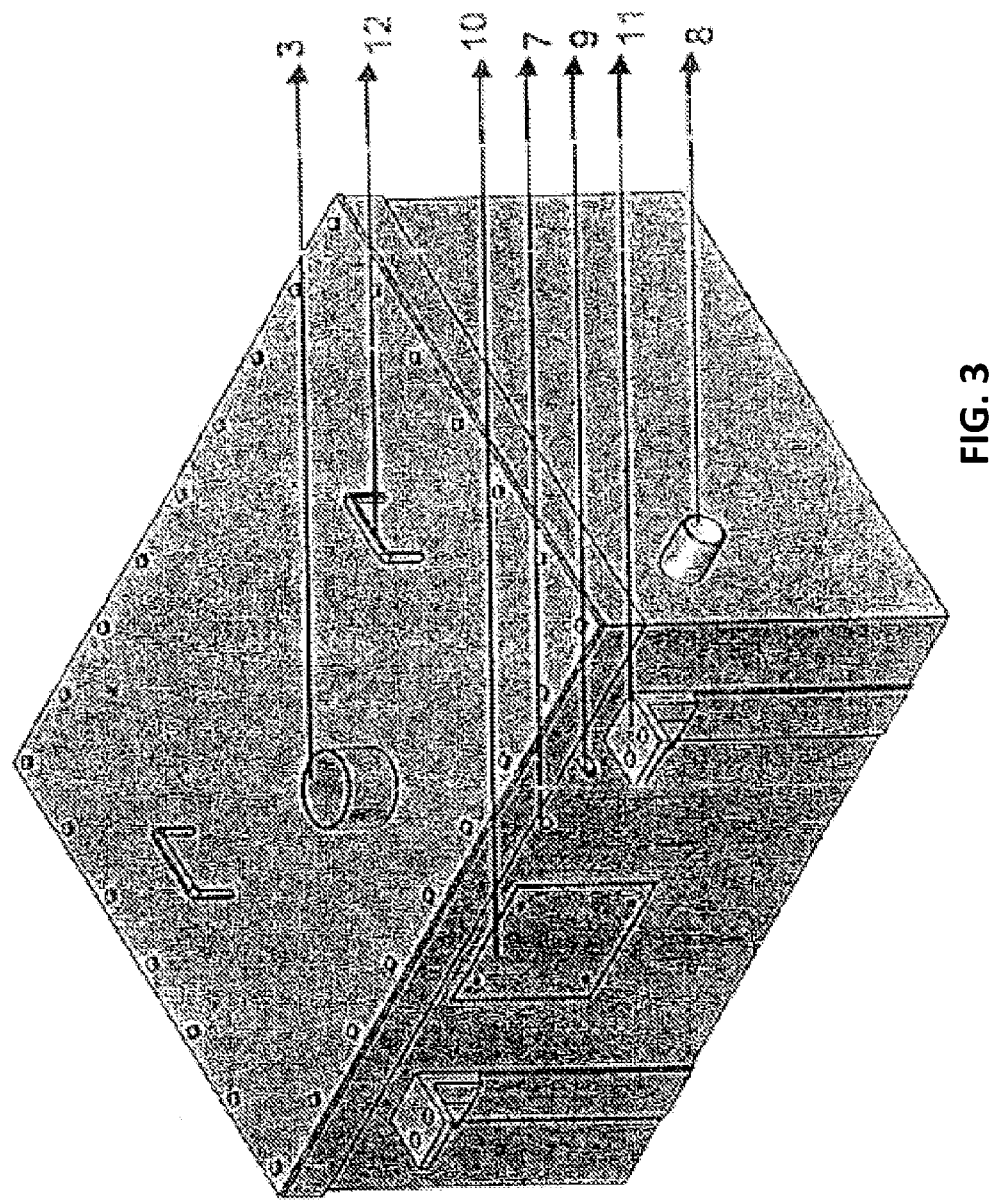
FIG. 3: shows the isometric view of the digester.

Referring to FIGS. 1 and 2, the apparatus consists of one rectangular SS tank having thickness of 3 mm with working volume of 300-400 L. The tank is divided into two chambers; one for biological treatment (1) and another for chemical treatment (2). The tank has dimensions of 900-1000 mmI× 650-750 mmW×575-625 mmD. One submerged inlet pipe (3) of diameter 70-100 mm is meant for connecting the toilet of the coach to the tank. The fermentation chamber is divided into five sub-chambers, with the help of partition walls of 475-500 mm height having a thickness of 2 mm (4, 5). PVC sheets having a surface area of 59 $m^2/g$ and thickness of 7-10 mm are provided on both sides of partition walls (4) as well as on inner side of side walls (5) besides at the bottom. The chlorination tank (2) is made alongside the inlet chamber by providing a SS wall. The dimensions of the chlorination tank are 190-210 mm×325-425 mm×575-625 mm. The partition between fermentation and chlorination tank contains an inverted 'L' shape GI pipe (6) of 50-60 mm diameter as passage for fermented waste to pass into the chlorination tank. Chlorination tank is fitted with an inlet pipe (7) connected with the chlorine dispensing assembly to dispense the chlorine into the biologically treated waste. The digester has one effluent discharge pipe (8) of 50-60 mm diameter. The digester has one gas outlet pipe (9) of 10-12 mm diameter, and a maintenance window (10) of 150×150 mm for maintenance purpose. The digester is also provided with two inbuilt stainless steel supports culminating into four hooks (11) that will be used for fixing the digester under the coach. Two handles (12) on the lid of the digester are provided to facilitate its opening for maintenance.

ADVANTAGES OF THE INVENTION

The present has the following advantages:

The digester is useful for the onboard treatment of human waste for railways, buses and other public transport systems for converting it into the effluent which is odorless, free from pathogens and does not create any aesthetic nuisance.

The digester provides onsite treatment of human waste avoiding the need for its transportation to the site of treatment.

The digester has an anaerobic chamber has long path and time for biological treatment.

The immobilization matrix in the form of PVC on partitions, bottom and sides for attachment of bacteria to prevent washout, having higher cell mass for enhanced fermentation, better tolerance of bacteria for adverse environmental conditions and to have better baffling.

The submerged inlet pipes prevent the entry of foul smelling gases from the head space to the toilet.

The maintenance window on the side of fermentation chamber helps in removal of sludge and maintenance.

The digester provides biochemical treatment of human waste with integrated chlorination chamber.

An apparatus with automated chlorination of fermented waste.

An apparatus for final and safe discharge of biochemically treated human waste in continuous mode.

We claim:

1. A digester for degradation of human waste from a public transport vehicle, the digester comprising:
    a main tank having a biochemical treatment compartment and a chemical treatment compartment connected by a connecting pipe as a passage for biochemically treated waste to the chemical treatment compartment, the main tank being sized for receipt and attachable beneath the public transport vehicle;
    the biochemical treatment compartment has at least one loosely fitted partitioned wall, at least one inlet to receive waste, at least one gas outlet, and at least one waste drain pipe to remove sludge; and
    the chemical treatment compartment has a discharge through which chemically treated waste is discharged, and a float ball assembly to release a chemical for chemical treatment.

2. The digester as claimed in claim 1, wherein the at least one loosely fitted partitioned wall is open from above or below or a combination thereof in the biochemical compartment.

3. The digester as claimed in claim 1, wherein the at least one loosely fitted partitioned wall of the biochemical treatment compartment, inner sides of the biochemical treatment compartment, and a bottom of the biochemical treatment compartment include PVC sheets on at least one side.

4. The digester as claimed in claim 3, wherein the PVC provides an immobilization matrix for attachment of bacteria in the biochemical treatment compartment.

5. The digester as claimed in claim 1, wherein the connecting pipe is an inverted "L" shaped galvanized iron pipe.

6. The digester as claimed in claim 1, wherein the chemical treatment compartment has the float ball assembly fitted onto a lever to supply the chemical for chemical treatment in the chemical treatment compartment.

7. The digester as claimed in claim 6, wherein the chemical used for chemical treatment is chlorine balls.

8. The digester as claimed in claim 1, wherein the discharge comprises a siphon.

9. The digester as claimed in claim 1, wherein the main tank has a groove in a central top portion.

10. The digester as claimed in claim 1, wherein the main tank has a depth of 575 mm to 625 mm.

11. The digester as claimed in claim 1, wherein the public transport vehicle comprises a railway, and wherein the main tank has a width that spans a coach of the railway.

12. The digester as claimed in claim 11, wherein the main tank has a central notch that accommodates at least one supply line between adjacent compartments of the railway.

13. The digester as claimed in claim 1, wherein the public transport vehicle comprises a bus.

14. A digester for degradation of human waste from a public transport vehicle, the public transport vehicle including a toilet, the digester comprising:
   a main tank having a biochemical treatment compartment and a chemical treatment compartment connected by a connecting pipe as a passage for biochemically treated waste to the chemical treatment compartment;
   the biochemical treatment compartment has at least one loosely fitted partitioned wall, at least one inlet that receives waste from the toilet on the public transport vehicle, and at least one gas outlet; and
   the chemical treatment compartment has at least one discharge through which chemically treated waste is discharged, and an inlet pipe to release a chemical for chemical treatment.

15. The digester as claimed in claim 14, wherein at least four hooks are coupled to outer walls of the main tank.

16. The digester as claimed in claim 14, wherein at least two handles are provided on a top lid of the digester.

17. The digester as claimed in claim 14, wherein a maintenance window is provided for the cleaning and maintenance of the digester.

18. The digester as claimed in claim 14, wherein the at least one loosely fitted partitioned wall of the biochemical treatment compartment, inner sides of the biochemical treatment compartment, and a bottom of the biochemical treatment compartment include PVC sheets on at least one side.

19. The digester as claimed in claim 14, wherein the connecting pipe is an inverted "L" shaped galvanized iron pipe.

20. The digester as claimed in claim 14, wherein the discharge comprises a siphon.

21. The digester as claimed in claim 14, wherein the chemical used for chemical treatment is chlorine balls.

* * * * *